US005200761A

United States Patent [19]

Kawakita et al.

[11] Patent Number: 5,200,761

[45] Date of Patent: Apr. 6, 1993

[54] THERMAL PRINTING APPARATUS

[75] Inventors: Kozo Kawakita; Koichi Kokusho, both of Tokyo, Japan

[73] Assignee: Sony Corporation, Tokyo, Japan

[21] Appl. No.: 596,082

[22] Filed: Oct. 11, 1990

[30] Foreign Application Priority Data

Oct. 12, 1989 [JP] Japan .................................. 1-265758
May 25, 1990 [JP] Japan .................................. 2-136432

[51] Int. Cl.[5] ......................... B41J 2/32; G01D 15/24

[52] U.S. Cl. ............................. 346/76 PH; 346/134; 346/136; 400/120

[58] Field of Search .................. 346/76 PH, 134, 136; 400/120

[56] References Cited

FOREIGN PATENT DOCUMENTS 61-109387 5/1986 Japan .
63-4981 1/1988 Japan .
63-268651 11/1988 Japan .

*Primary Examiner*—Benjamin R. Fuller

*Assistant Examiner*—Huan Tran

[57] ABSTRACT

A thermal printer comprises a thermal head having a plurality of heating elements arranged in line in the horizontal direction, a printing data processing circuit responsive to input video signal for energizing the heating elements of the thermal head in accordance with density information of each pixel, a driving device for moving a print paper relative to the thermal head continuously in the vertical direction, a pitch setting circuit for setting a vertical print pitch according to the number of effective horizontal print lines, effective width of the thermal head in the horizontal direction and aspect ratio of a printed image, and a speed control circuit coupled to the driving device for changing a moving speed of the print paper according to the vertical print pitch, wherein an energizing time to the heating elements is fixed independent of the vertical print pitch, and the moving speed of the print paper and an interval between first printing data and second printing data are controlled in order to make density of the printed image constant independent of the vertical print pitch.

2 Claims, 6 Drawing Sheets

THERMAL PRINTING APPARATUS

BACKGROUND OF THE INVENTION

1. Field of the Invention

The present invention generally relates to thermal printing apparatus and, more particularly, is directed to a thermal printing apparatus in which a correct density of printed image can be realized by a set of correction data regardless of a horizontal frequency of a video signal and an aspect ratio.

2. Description of the Prior Art

A conventional thermal printing apparatus produces a video picture as a hard copy printed image according to the following method. This method will be described hereinafter with reference to FIGS. 1A to 1C.

Referring to FIG. 1A, there are shown a thermal print head 1 which is comprised of heating elements $R_1$ to $R_n$ (m=1280) of one horizontal line, for example, 1280 pixels and in which the heating elements $R_1$ to $R_m$ are provided in the horizontal direction, and a print paper 2 on which an image is printed. The print paper 2 is continuously transported in the vertical direction relative to the thermal print head 1.

At that time, the print paper 2 is made as a thermal printing paper or the print paper 2 is a standard paper. In the latter case, a thermal print ink ribbon (not shown) is interposed between the thermal print head 1 and the print paper 2.

Pixel data of one horizontal line of a video signal (luminance signal), in this example, pixel data of m number are converted into pulse width modulated (i.e., PWM) signals $S_1$ to $S_m$ of pulse width Td corresponding to the densities of respective pixels as shown in FIG. 1B. Then, these PWM signals $S_1$ to $S_m$ are supplied to the heating elements $R_1$ to $R_m$, respectively.

Accordingly, pixels $P_1$ to $P_m$ of m number are simultaneously printed on the print paper 2 at every line by the heating elements $R_1$ to $R_m$ and, as shown in FIG. 1C, lengths L in the vertical direction of the pixels $P_1$ to $P_m$ are changed in response to the pulse widths Td of the PWM signals $S_1$ to $S_m$, thereby densities of pixels $P_1$ to $P_m$ being expressed, respectively. In this case, for example, 7 bits are assigned to one pixel and the density or darkness thereof is expressed by 128 gray levels.

The aforenoted operations are carried out for all pixels at every horizontal line, thus the video picture being produced as the hard copy. Although the signals $S_1$ to $S_m$ are pulse number modulated (PNM) signals, they are described as the PWM signals for simplicity.

FIG. 2 shows an example of a circuit for effecting such hard copy operation.

As FIG. 2 shows, the heating elements $R_1$ to $R_m$ of the thermal print head 1 and collector-emitter paths of transistors $Q_1$ to $Q_m$ which drive the heating elements $R_1$ to $R_m$ are respectively connected in series between a voltage source terminal $T_0$ and the ground.

A frame memory 11 derives pixel data $d_1$ to $d_m$ of one horizontal line and the pixel data $d_1$ to $d_m$ are supplied through a line memory 12 to a converting circuit 13, in which they are converted into data $D_1$ to $D_m$, respectively.

In that case, each of the data $d_1$ to $d_m$ is formed of, for example, 7 bits as described above and the data $D_1$ to $D_m$ are 128 bits which are equal to the 128 gray levels of densities for the pixel. Of 128 bits, the bits of the number corresponding to the density of pixels from the starting bit are "1" (high level) and the remaining bits are "0" (low level). Therefore, it is to be appreciated that the data $D_1$ to $D_m$ are the PWM signals (strictly speaking, PNM signals as earlier noted) $S_1$ to $S_m$.

Of the data $D_1$ to $D_m$ thus converted, n'th bits $b_1$ to $b_n$ (n=1 to 128) are supplied through a latch circuit 14 to the bases of the transistors $Q_1$ to $Q_m$, respectively.

Accordingly, the pixels $P_1$ to $P_m$ are printed on the print paper 2 at every horizontal line by the data $D_1$ to $D_m$ (signals $S_1$ to $S_m$) and, the lengths L in the vertical directions of the pixels $P_1$ to $P_m$ are respectively changed in response to the pulse number (pulse widths Td of the signals $S_1$ to $S_m$) of the data $D_1$ to $D_m$, thereby the hard copy of the video picture being obtained as described hereinbefore in FIG. 1.

However, at that time, the print paper 2 is generally white and the densities of pixels are expressed in black by the thermal print head 1 so that, if a relationship between the level of the video signal and the pulse width Td of the PWM signal Si is made linear, the density of the printed image relative to the level of the video signal will not become linear.

To solve this problem, the data $d_1$ to $d_m$ from the frame memory 11 and passing through the line memory 12 are supplied to a correcting circuit 15, thereby forming correcting data $C_1$ to $C_m$. The correcting data $C_1$ to $C_m$ are supplied to the converting circuit 13, whereby the pulse widths Td of the signals $S_1$ to $S_m$ are respectively corrected. Thus, the density of the printed image on the print paper 2 is made linear.

In the following description, if the PWM signals $S_1$ to $S_m$ need not be discriminated from each other, they will be referred to hereinafter as the PWM signal Si.

When the hard copy of the video picture is obtained by using the above-mentioned thermal printing apparatus, it is frequently observed that a problem will occur depending upon a video signal.

That is, a video signal according to the NTSC system has 525 horizontal scanning lines and an aspect ratio of the picture screen is 3:4, whereas a video signal derived from, for example, an X-ray video camera has a different standard from the NTSC video signal.

Further, when a hard copy of a picture of a personal computer is obtained, if the hard copy is obtained under the condition that the picture is rotated on the print paper 2 by 90 degrees, then the short side of the picture screen corresponds to the length direction of the thermal print head 1 so that the size of the printed image can be increased. In that case, the aspect ratio of the picture becomes 4:3 from a printing apparatus standpoint. Furthermore, a so-called high definition television receiver (i.e., HDTV receiver)has a picture screen whose aspect ratio is 9:16.

There are video signals of various types and standards as described above.

Let it now be assumed that, for example, the hard copy of the picture of the NTSC video signal is standard, a pixel Pa in FIG. 3A indicates a pixel printed at that time and that its vertical print pitch Vp is a standard value. Further, a characteristic (standard characteristic) shown by a curve A in FIG. 3B assumes a characteristic of gray level of the video signal relative to the density of a printed image at that time.

When a hard copy of video signal according to the different standard is obtained relative to the above-mentioned standard hard copy, let us assume the following conditions:

The moving speed of the print paper 2: constant

The pulse width Td of the PWM signal Si: constant
The cycle Th of the PWM signal: altered where $$\text{moving speed of a print paper} \times \text{pulse width } Td = \text{length of } L \text{ of pixel} \quad \text{(i)}$$

$$\text{moving speed of a print paper} \times \text{cycle } Th = \text{vertical print pitch } Vp \quad \text{(ii)}$$

In the case of a certain video signal, it is assumed that the aspect ratio of a printed video image is equal to that of the NTSC video signal and the number of effective horizontal print lines is 3/2 times as the number of effective horizontal print lines of the NTSC video signal.

In that case, the cycle Th of the PWM signal Si must be selected to be 2/3 times the cycle of the NTSC video signal and the vertical print pitch of the pixel Pb of the hard copy must be selected to be 2/3 times the vertical print pitch of the NTSC video signal as shown by the pixel Pb in FIG. 3A, otherwise the aspect ratio of the printed image will become different.

If so, a ratio L/Vp in which the pixel Pb occupies the picture screen in the vertical direction becomes larger than that of the pixel Pa of the NTSC video signal because the length L of the pixel Pb is determined by the pulse width Td of the PWM signal Si and is equal, in that case, to that of the NTSC video signal.

Therefore, the density of printed image of the resultant hard copy is unavoidably increased as shown by a curve B in FIG. 3A.

Further, let it be assumed that other video signal whose aspect ratio is equal to that of the NTSC video signal and that the number of effective horizontal print lines is 3/4 times the NTSC video signal. In that case, the cycle Th of the PWM signal Si must be increased to 4/3 times that of the NTSC video signal and the vertical print pitch Vp of the pixel Pc of the hard copy printed paper must be increased 4/3 times that of the NTSC video signal as shown by the pixel Pc in FIG. 3A, otherwise the aspect ratio of printed image of this video signal is not made correct.

However, if so, the length L of the pixel Pc is determined by the pulse width Td of the PWM signal Si and in this case it is equal to that of the pixel of the NTSC video signal, so that the ratio L/Vp in which the pixel Pc occupies the vertical direction is made smaller than that of the pixel Pa of the NTSC video signal.

As a result, a density of a printed image of the resultant hard copy print paper is decreased as shown by a curve C in FIG. 3B.

In the case of video signal having the same number of horizontal scanning lines as that of the NTSC video signal and whose aspect ratio is different from that of the NTSC video signal, the vertical print pitch Vp thereof is different so that the density of printed image is also changed.

When the standards of the video signals are different as described above, if the hard copy printed paper is obtained under the aforenoted conditions, the density of printed image is fluctuated as shown in FIG. 3B.

Accordingly, when the standard of the video signal is different, the following conditions are proposed:

A moving speed of print paper 2: altered
A pulse width Td of PWM signal Si: constant
A cycle Th of PWM signal Si: constant According to the above-described conditions, if the aspect ratio of printed image of video signal is equal to that of printed image of the NTSC video signal, although the moving speed of the print paper 2 is changed in response to the number of effective horizontal print lines, the pulse width Td and the cycle Th of the PWM signal Si are constant so that, when the number of effective horizontal print lines of the video signal is 3/2 times that of the NTSC video signal, the pixel printed on the print paper 2 becomes as shown by a pixel Pb in FIG. 4A or that, when the number of effective horizontal print lines of the video signal is 3/4 times that of the NTSC video signal, the pixel printed on the print paper becomes as shown by a pixel Pc in FIG. 4A (pixel Pa in FIG. 4A is the same as the pixel Pa in FIG. 3A).

Accordingly, in that case, the ratios L/Vp between the vertical print pitches $Vp_a$ to $Vp_c$ of pixels Pa to Pc and the lengths $L_a$ to $L_c$ of pixels Pa to Pc are equal to each other regardless of the number of effective horizontal print lines, whereby characteristic curves of gray levels of the video signals and the densities of printed images are all coincident with each other. Therefore, it is appreciated that regardless of the standard and the kind of the video signal, the correct density of printed image can be obtained.

However, the thermal print head 1 has a heat storage capability and the aforenoted equation (i) cannot be established due to the influence of such heat storage capability and the like with the result that, in actual practice, the density characteristics are provided as shown by curves B and C in FIG. 4B and are not coincident with the correct curve A. That is, the correct density characteristic cannot be obtained.

Therefore, when the characteristic curves B and C are not coincident with the correct characteristic curve A as shown in FIGS. 3B and 4B, it may be considered that the characteristic curves B and C are made coincident with the correct characteristic curve A by changing the correction data $C_1$ to $C_m$ in the correcting circuit 15.

However, if so, the density of printed image is formed of 128 gray levels so that correction data of amount corresponding to the kinds of video signal to be printed$\times$128 are required, which unavoidably makes the memory very large in storage capacity for storing the correction data in actual practice Further, it is very cumbersome to form correction data of such large amount.

OBJECTS AND SUMMARY OF THE INVENTION

Accordingly, it is an object of the present invention to provide an improved thermal printing apparatus which can eliminate the aforenoted shortcomings and disadvantages encountered with the prior art.

More specifically, it is an object of the present invention to provide a thermal printing apparatus in which a density of a printed image can made constant independent of a vertical print pitch.

It is another object of the present invention to provide a thermal printing apparatus which is applied to both of a monochromatic printer and a color printer.

According to an aspect of the present invention, a thermal printer is comprised of a thermal head having a plurality of heating elements arranged in line in the horizontal direction, a printing data processing circuit responsive to input video signal for energizing the heating elements of the thermal head in accordance with density information of each pixel, a driving device for moving a print paper relative to the thermal head continuously in the vertical direction, a pitch setting circuit for setting a vertical print pitch according to the number of effective horizontal print lines, effective width of the thermal head in the horizontal direction and aspect ratio of a printed image, and a speed control circuit coupled to the driving device for changing a moving speed of the print paper according to the vertical print pitch, wherein an energizing time to the heating elements is fixed independent of the vertical print pitch, and the rate of travel or the moving speed of the print paper and an interval between first printing data and second printing data are controlled in order to make density of the printed image constant independent of the vertical print pitch.

The preceding, other objects, features and advantages of the present invention will be apparent in the following detailed description of a preferred embodiment when read in conjunction with the accompanying drawings, in which like reference numerals are used to identify the same or similar parts in the several views.

DETAILED DESCRIPTION OF A PREFERRED EMBODIMENT

Figures 1A, 1B, 1C:
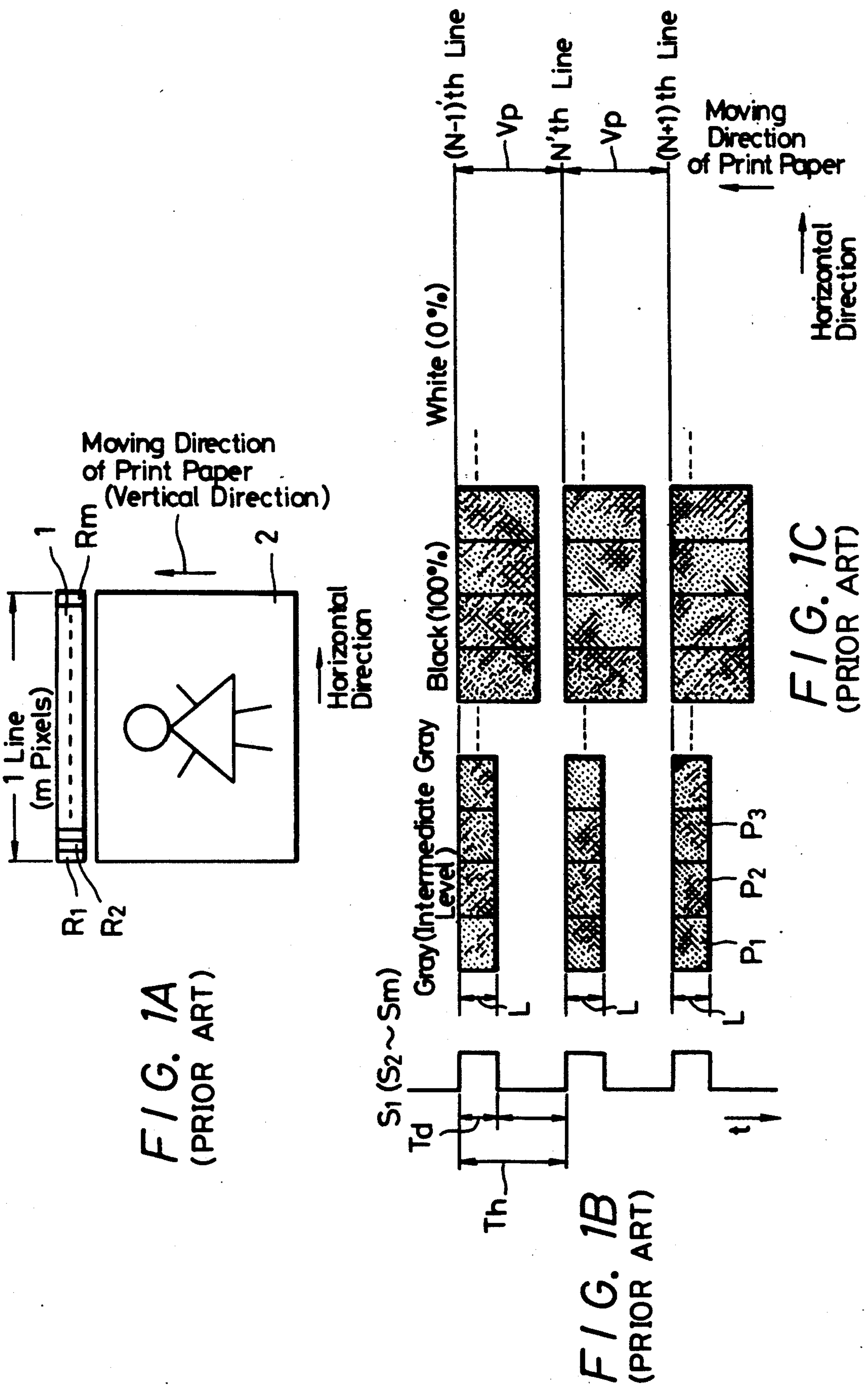
FIG. 1A (PRIOR ART)
FIG. 1B (PRIOR ART)
FIG. 1C (PRIOR ART)
FIGS. 1A to 1C are schematic diagrams useful in understanding a fundamental principle of a conventional thermal printing apparatus, respectively.
Figure 2:
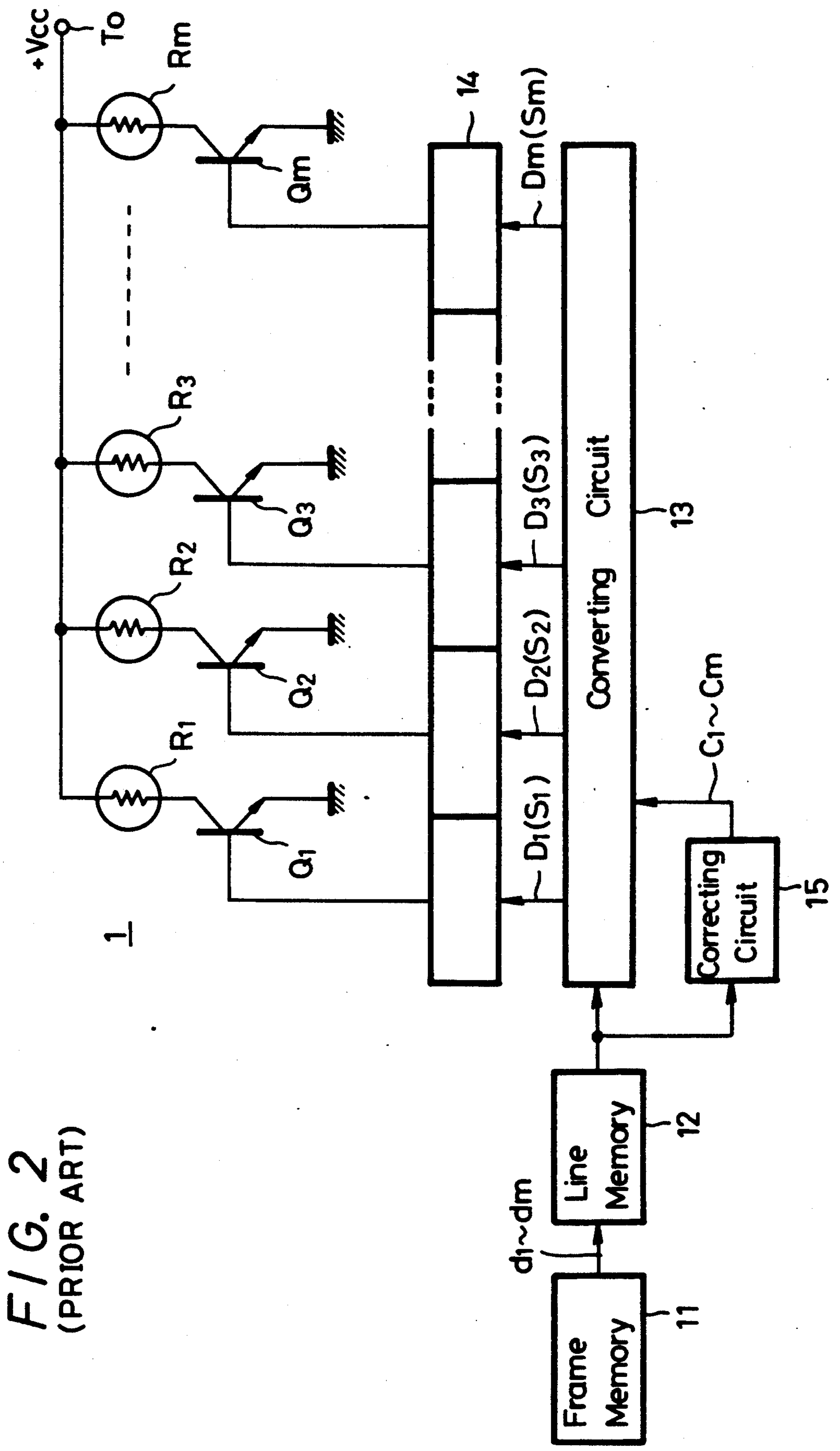
FIG. 2 (PRIOR ART)
FIG. 2 is a schematic block diagram showing a circuit arrangement of the prior-art thermal printing apparatus.
Figure 3A:
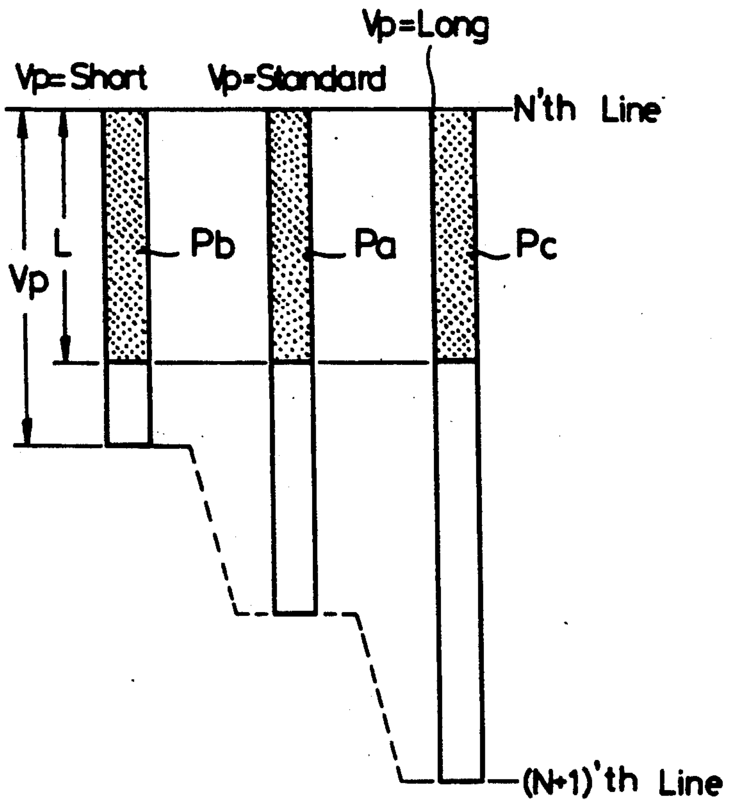
FIG. 3A (PRIOR ART)
FIGS. 3A, 3B and FIGS. 4A, 4B are schematic diagrams and graphs used to explain an operation of the conventional thermal printing apparatus, respectively.
Figure 3B:
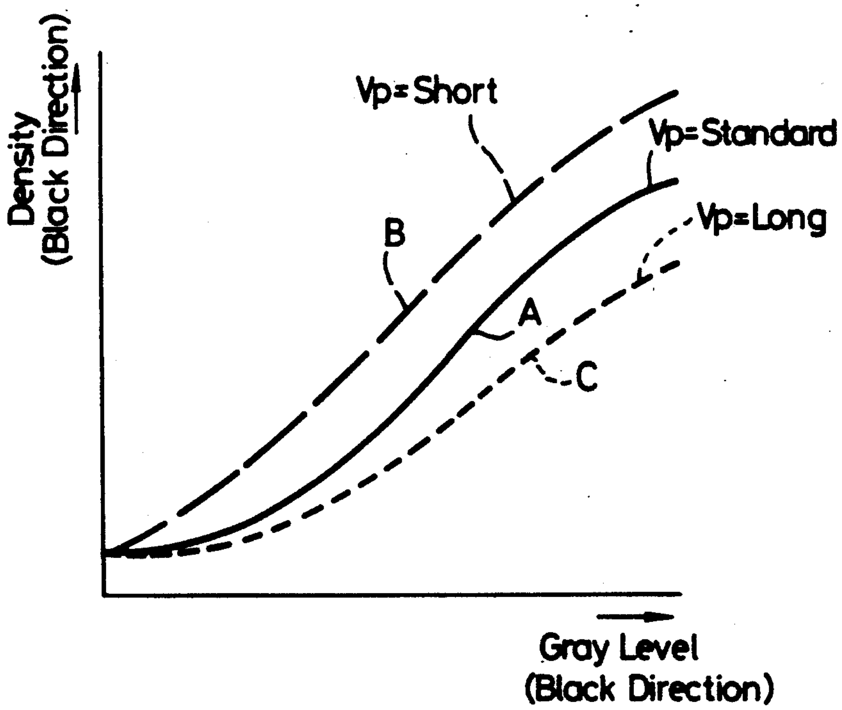
FIG. 3B (PRIOR ART)
Figure 4A:
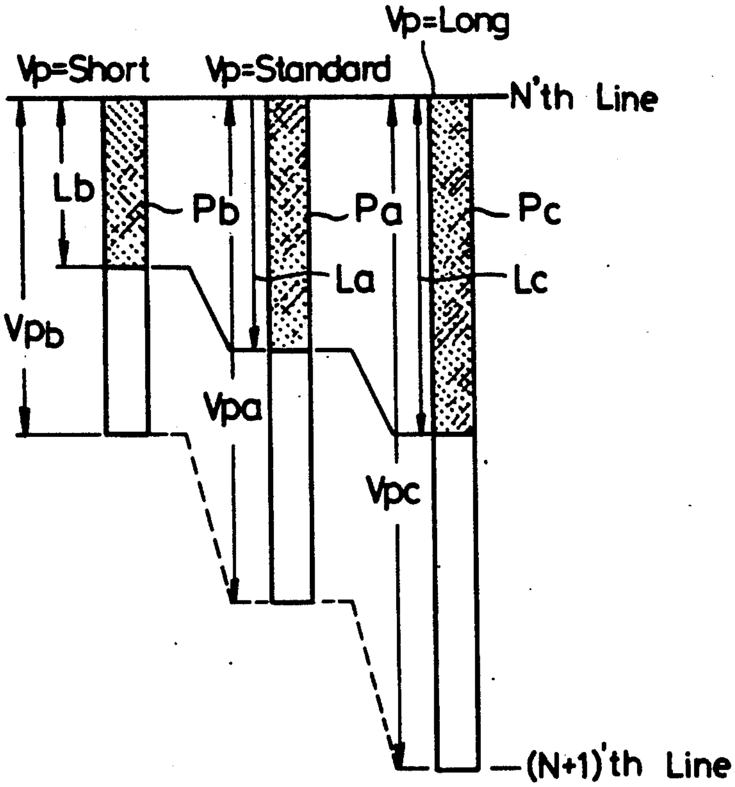
FIG. 4A (PRIOR ART)
Figure 4B:
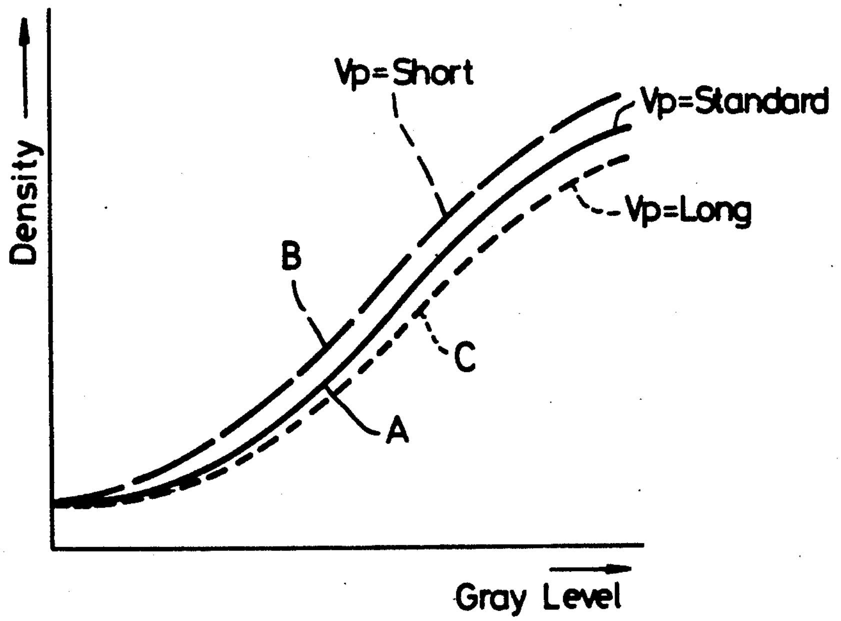
FIG. 4B (PRIOR ART)
Figure 5:
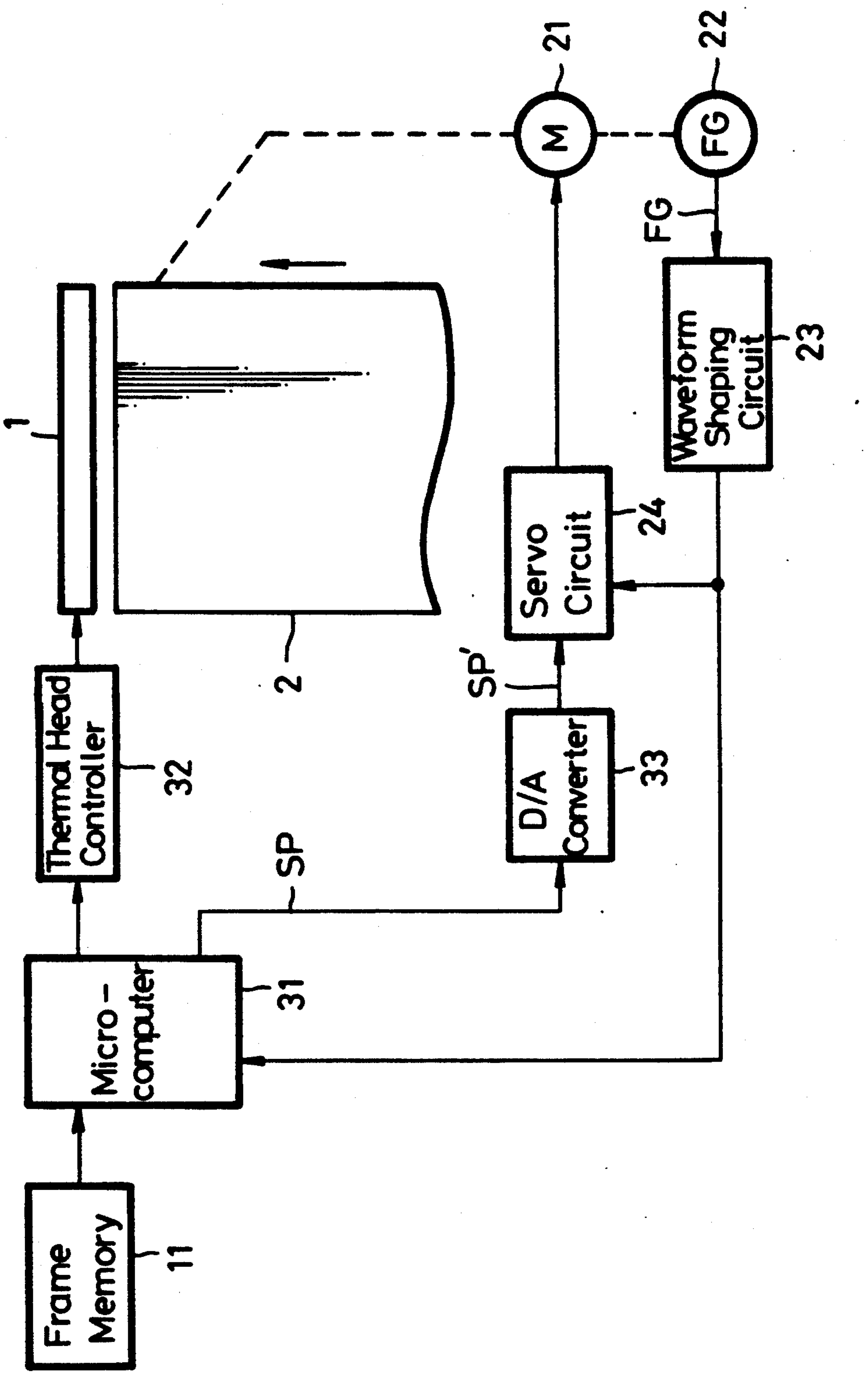
FIG. 5 is a systematic block diagram showing an embodiment of a thermal printing apparatus according to the present invention.
Figure 6A:
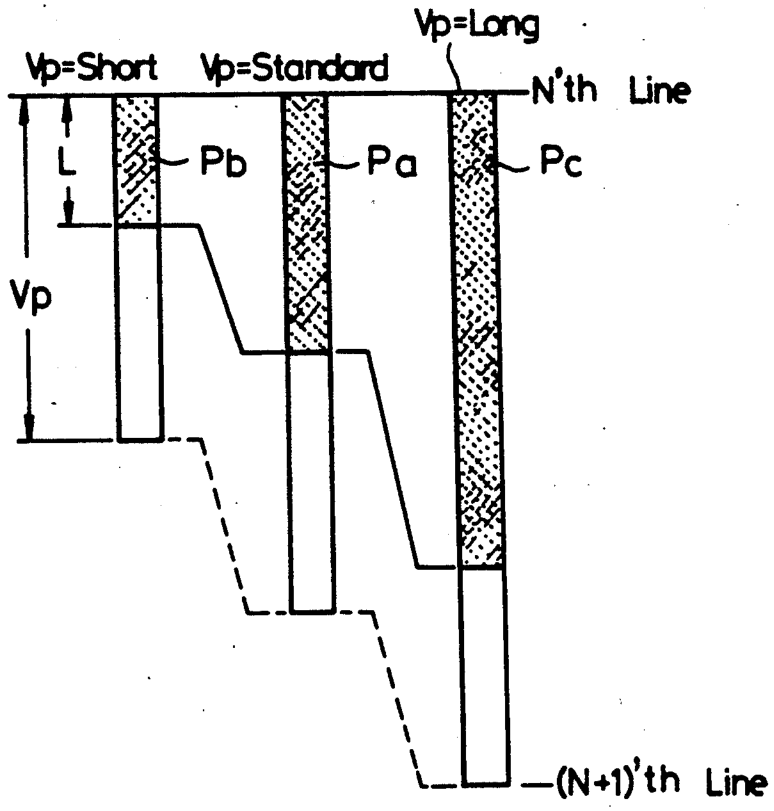
FIGS. 6A and 6B are schematic diagram and graph used to explain an operation of the thermal printing apparatus shown in FIG. 5, respectively.
Figure 6B:
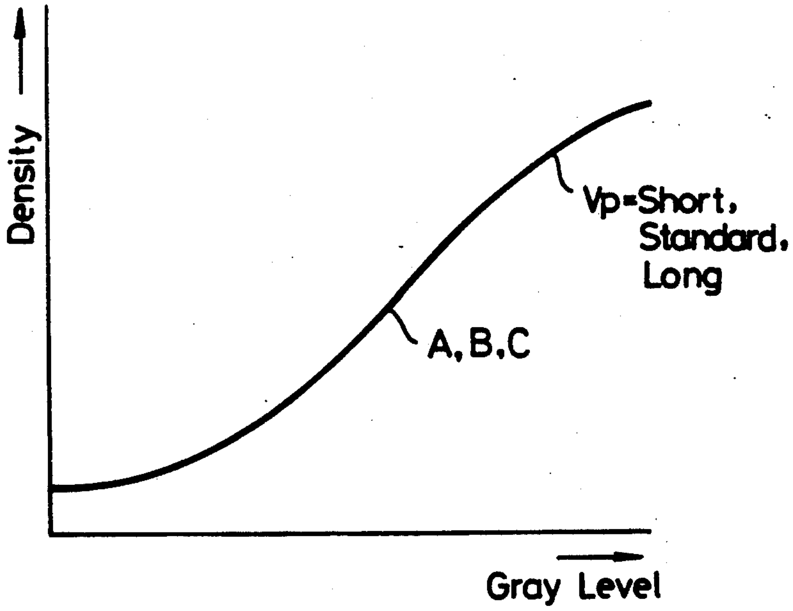

An embodiment of a thermal printing apparatus according to the present invention will now be described with reference to FIG. 5 and FIGS. 6A and 6B. In FIG. 5 and FIGS. 6A and 6B, like parts corresponding to those of FIG. 2 and FIGS. 3A, 3B and FIGS. 4A, 4B are marked with the same references and therefore need not be described in detail.

Referring to FIG. 5 which is a block diagram of the circuit of the present invention, there is shown a DC motor 21 which revolves to move the print paper 2 in the vertical direction relative to the thermal print head 1 continuously.

A frequency generator 22 is coupled to the DC motor 21 to generate one pulse FG per revolution of the motor 21, that is, each time the print paper 2 is moved by a predetermined amount, for example, 8.2 microns. The pulse FG from the frequency generator 22 is supplied through a waveform shaping circuit 23 to a servo circuit 24.

A microcomputer 31 is provided by which an operation of this thermal printing apparatus is controlled.

More specifically, the microcomputer 31 determines the rate of travel of the moving speed of the print paper 2 and the vertical print pitch Vp (i.e., the cycle Th of the PWM signal Si) of the pixel Pi in response to the standard or kind of a video signal to be printed. Moving speed data SP from the microcomputer 31 is supplied to a digital-to-analog (D/A) converter 33, in which it is converted into an analog data signal SP'. This analog data signal SP, is supplied to a servo circuit 24 as a target value.

Then, the servo circuit 24 derives a servo output corresponding to a difference between the pulse FG and the signal SP', and this servo output is supplied to the DC motor 21. Accordingly, the DC motor 21 is rotated at a constant speed corresponding to the signal SP' or SP, whereby the print paper 2 is moved at the constant speed determined by the microcomputer 31.

While the print paper 2 is moved at the constant speed, the pulse FG from the waveform shaping circuit 23 is supplied to the microcomputer 31 so that, when the frequency generator 22 generates the pulse FG of the number corresponding to the moving pitch of the print paper 2, that is, the vertical print pitch Vp of the pixel Pi (i.e., the cycle Th of the signal Si) or when the frequency generator 22 generates 18 pulses FG because $Vp = 148$ microns $= 8.2$ microns $\times 18$ in the case of, for example, the NTSC video signal, the microcomputer 31 controls the frame memory 11 to derive pixel data $d_1$ to $d_m$ of one horizontal line. The data $d_1$ to $d_m$ are supplied through a head controller 32 to the thermal print head 1, whereby pixels $P_1$ to $P_m$ of one horizontal line are printed on the print paper 2.

The aforenoted operation is carried out at every horizontal line at the same time when the print paper 2 is moved, thereby the video image being printed as the hard copy.

In this fashion, the video image is printed as the hard copy. When the video signal in that case is such that the number of horizontal lines is, for example, 3/2 times that of the NTSC video signal and that the aspect ratio thereof is equal to that of the NTSC video signal, the moving speed of the print paper 2 is made slower than $\frac{2}{3}$ times the moving speed of the print paper 2 of the NTSC video signal and the cycle Th of the PWM signal Si is increased in response thereto, whereby the vertical print pitch Vp of the pixel Pb of the hard copy is $\frac{2}{3}$ times that of the NTSC video signal and the length L of the pixel Pb is made shorter than $\frac{2}{3}$ times that of the NTSC video signal as shown by the pixel Pb of FIG. 6A. Therefore, as shown by a curve B in FIG. 6B, a density characteristic at that time coincides with the correct density characteristic shown by the curve A in FIGS. 3B and 4B, that is, the correct density characteristic can be obtained.

In the case of a video signal in which the number of horizontal lines is, for example, $\frac{3}{4}$ times that of the NTSC video signal and its aspect ratio is equal to that of the NTSC video signal, the moving speed of the print paper 2 is increased to be higher than 4/3 times that of the NTSC video signal, and the cycle Th of the PWM signal Si is reduced in correspondence therewith, whereby the vertical print pitch Vp of the pixel Pc is made longer than 4/3 times that of the NTSC video signal and the length L of the pixel Pc is made longer than 4/3 times that of the pixel Pc as shown in FIG. 6A. Therefore, as shown by a curve C in FIG. 6B, the resultant density characteristic NTSC becomes coincident with the correct density characteristic shown by the curve A in FIG. 6B, that is, the correct density characteristic can be obtained.

In the foregoing, the number of horizontal lines and the aspect ratio of the NTSC video signal are taken as the standard ones and the video signals which are different in the number of horizontal lines and which are equal in the aspect ratio of printed image are described, by way of example. In general, $$\text{vertical print pitch } Vp = \text{effective width of the thermal head 1 (length of one line)} \times \text{aspect ratio of printed image/number of effective horizontal print lines}$$

Thus, in actual practice, the vertical print pitch Vp is obtained on the basis of the standards (aspect ratio and the number of effective horizontal print lines) of the video signal and the moving speed of the print paper 2 is determined in accordance with the vertical print pitch Vp thus obtained.

More precisely, when the vertical print pitch Vp is B times ($B>1$) the vertical print pitch Vp of the standard video signal, the moving speed or the rate of travel of the print paper 2 is increased to be higher than B times of the moving speed of the print paper 2 of the standard video signal to increase the length L of the pixel Pi to be longer than B times that of the standard video signal and the printing cycle Th is reduced in correspondence therewith.

Further, when the vertical print pitch Vp is C times ($0<C<1$) the vertical print pitch Vp of the standard video signal, the moving speed or the rate of travel of the print paper 2 is decreased to be slower than C times that of the standard video signal to reduce the length L of the pixel Pi to be shorter than C times that of the standard video signal, and the printing cycle Th is increased in correspondence therewith.

Furthermore, in the foregoing, the thermal printing apparatus of this invention is applied to a monochromatic printer and the present invention can also be applied to a color printer.

As set out above, according to the present invention, the hard copy of the video image can be printed. Particularly, according to the present invention, when a video signal to be printed has different vertical print pitch Vp because the number of effective horizontal print lines and the aspect ratio of this video signal are different from those of the standard video signal, the moving speed or the rate of travel of the print paper 2 is controlled in response to the vertical print pitch Vp so as to change the length L of the pixel Pi and to control the printing cycle Th in correspondence therewith.

Therefore, regardless of the standard or the kind of the video signal, the density characteristic of such video signal can be made coincident with the curve A of the correct density characteristic as shown by the curves B and C in FIG. 6B, whereby the correct density characteristic can be obtained.

Furthermore, the correction data $C_1$ to $C_m$ need not be prepared for every video signal, that is, a memory of very large storage capacity need not be provided. In addition, it is not necessary to provide correction data of much amount.

Having described a preferred embodiment of the invention with reference to the accompanying drawings, it is to be understood that the invention is not limited to that precise embodiment and that various changes and modifications thereof could be effected by one skilled in the art without departing from the spirit or scope of the novel concepts as defined in the appended claims.

We claim as our invention:

1. A thermal printer comprising:

(1) a thermal head having a plurality of heating elements arranged along a line in a horizontal direction;

(b) printing data processing means for energizing said heating elements of said thermal head in accordance with a gray level of an input video signal;

(c) driving means for continuously moving a print paper relative to said thermal head in a vertical direction;

(d) pitch setting means for setting a vertical print pitch according to a number of effective horizontal print lines, an effective width of said thermal head in the horizontal direction and an aspect ratio of a printed image; and (e) speed control means coupled to said driving means for changing a moving speed of said print paper according to said vertical print pitch, wherein an energizing time to said heating elements is fixed independent of the vertical print pitch, and wherein said moving speed of said print paper and a prin ing cycle are controlled in order to make a density of said printing image constant independent of the vertical print pitch.

2. The thermal printer according to claim 1, in which a moving speed of said printer paper (S1) in a vertical print pitch (Vp1) and a second speed of said print paper (S2) in a second vertical print pitch (Vp2) have a following relationships:

$$S1>(Vp1/Vp2)\times S2, \text{ when } (Vp1/Vp2>1)$$

$$S1<(Vp1/Vp2)\times S2, \text{ when } (0<Vp1/Vp2<1).$$

* * * * *